F. P. BARRABE.
Hulling Machine.
No. 60,460.
Patented Dec. 18, 1866.
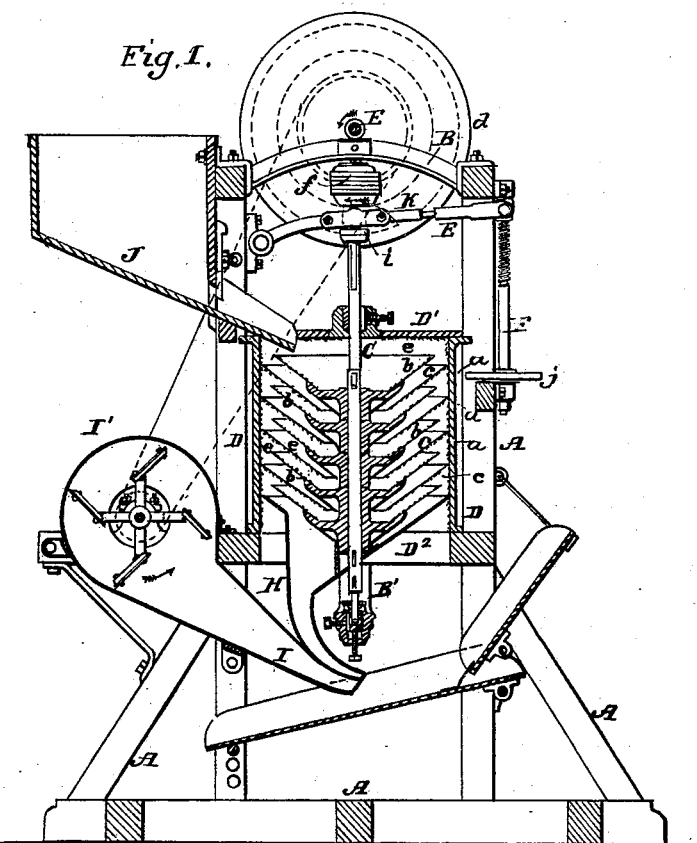
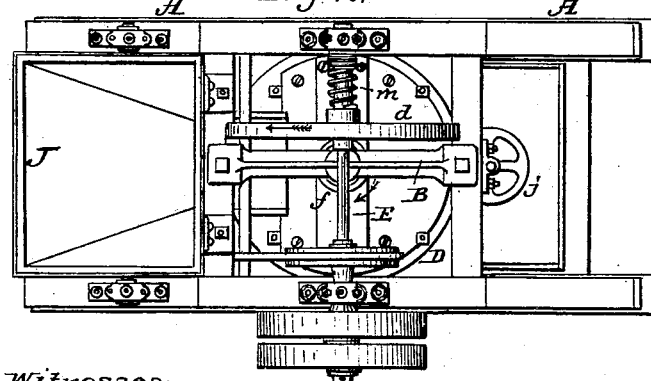
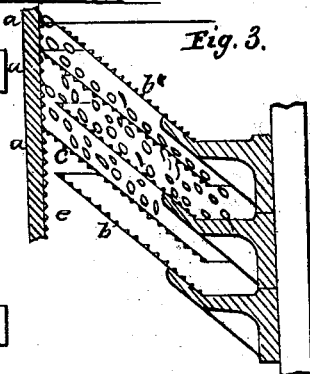

United States Patent Office.

IMPROVEMENT IN MACHINES FOR HULLING WHEAT.

E. P. BARRABÉ, OF PARIS, FRANCE.

Letters Patent No. 60,460, dated December 18, 1866.

---

The Schedule referred to in these Letters Patent and making part of the same.

---

TO ALL WHOM IT MAY CONCERN:

Be it known that I, E. P. BARRABE, of Paris, France, have invented certain improvements in Apparatus for Cleaning and Hulling Wheat and other Grains; and I do hereby declare the following to be a full, clear, and exact description of the same, reference being had to the accompanying drawing, and to the letters of reference marked thereon.

My invention consists of a casing serrated on the inside, and through the centre of which extends a revolving shaft, both the shaft and casing having inclined serrated plates secured to the same, and the whole being constructed and arranged as fully described hereafter, so that grain or coffee berries introduced into the casing will be thrown from one serrated plate to another, until the outer skin or hull is entirely removed. In order to enable others skilled in the art to make and use my invention, I will now proceed to describe its construction and operation, reference being had to the accompanying drawing, in which—

Figure 1 is a sectional elevation of my improved apparatus for hulling and cleaning grain, coffee berries, etc.

Figure 2, a plan view; and

Figure 3, a detached sectional view drawn to an enlarged scale.

A is the frame of the machine to which are secured two cross-pieces, B B$^1$, and in bearings in the latter turn the journals of a vertical shaft, C. The shaft extends through the centre of a casing, D, which consists of a series of rings, $a\ a$, placed one above the other, as shown in fig. 1; the said casing having a flat top, D$^1$, and a conical bottom, D$^2$, from which projects a curved pipe, H. To the shaft, C, are secured a number of serrated plates, $b\ b$, each of which is of the form of an inverted cone, and between these plates project similarly-shaped serrated plates, $c$, each of which is secured at its outer edge to one of the rings, $a$. In the centre of each plate, $c$, is an opening of such a size that the grain which is being hulled can pass readily between the plate and shaft, C. On the inside of the case, D, as well as at the under side of the top, D$^1$, is a serrated metal lining, $e$. The serrations of the plates and linings are formed by punching the plates from one side with a pointed instrument, the latter making openings, which on one side of the plate are surrounded by annular ridges with ragged edges, the serrated side being uppermost in the plates $b\ b$, underneath in the plates $c$, and on the inside of the lining $e$, for the purpose described hereafter. The conical plates, $b$, gradually increase in diameter, the highest having the largest, and the lowest the smallest diameter, so that the annular spaces between the edges of the plates and the lining of the casing, A, are of different widths, the highest being the widest, and the lowest the narrowest. In bearings at the upper end of the frame, A, turns a horizontal driving shaft, E, on which is a disk, $d$, the latter turning with, but being adjustable laterally on the shaft. A spring, $m$, which is coiled round the shaft, E, and bears against one side of the disk, $d$, maintains the latter in contact with a roller, $f$, which is secured to a sleeve, $i$, arranged to slide on, but turning with the shaft, $c$. To one side of the frame is hinged one end of a lever, K, projections on which fit into an annular recess in the sleeve, $i$, and at the opposite end of the lever is an adjustable nut, through which extends a vertical screw, F, the latter turning in bearings secured to the frame of the machine, and having near its lower end a hand-wheel, $j$. Beneath the tube, H, extends the blast tube, I, of a fan-blower, I$^1$, secured to the frame, and above this fan-blower is a hopper, J, a chute at the lower end of which extends through the top of the case, D; and on the shaft of the fan is a pulley round which a belt passes to a pulley on the driving shaft, E. The mass of grain, rice, or coffee berries to be hulled or cleaned is introduced into the hopper, J, and a rotary motion in the direction of its arrow is imparted to the driving shaft, E, when the operation of the machine will be as follows:

The grain first falls on to the upper revolving plate, $b$, and is either thrown outwards against the lining, $e$, or rolls over the serrated surface of the plate, and passes gradually outward until it falls between the edge of the plate and lining on to the plate, $c$; it then slides downward until it falls from this plate on to the next lower plate, $b$. The grain is now again thrown outward until it falls over the edge of the plate on to the next stationary plate, $c$, down which it slides to the next revolving plate, and so on until it passes from the tube, H. The smaller grains which fall on to the highest plate, $b$, pass readily between the edge of the latter and lining, $e$; when, however, a grain is too large to pass readily between the plate and lining, it will be carried round, sometimes rolling over the serrated surface of the plate, and sometimes being thrown violently against the serrated surface of the lining, e, until so much of the outer skin or covering has been detached by the action of the sharp-edged projections on the plates that it can pass downwards on to the plate, c, and to the plate b, below it. As the distance between the edge of the next plate, b, and the lining is less than that between the first plate and the lining, only the smallest grains can pass to the next plate, while the larger ones, to which a considerable portion of the skin yet adheres, are carried round and thrown back and forth between the plate, b, and the serrated plate, c, above it, until sufficiently reduced in size to pass downward to the next plate, when the operations are repeated. The outer coating is thus gradually removed from the grain, and it finally passes, entirely cleansed, and with the chaff, down the tube, H, and from the latter in front of the pipe, I, the blast from the pipe blowing away the chaff, while the grain falls into any suitable receptacle. By altering the position of the roller, f, so as to move it farther from or nearer to the centre of the disk, d, the speed at which the shaft, C, revolves, may be varied at pleasure, so that the grain may be a longer or shorter time in passing through the machine, some grain requiring to be acted on for a longer time than others. The plates, b c, may consist of sheets of thin metal punched from one side to form the serrations, as before described, or they may be made of cast iron or steel, the plates being inclined to a degree which may be found most suitable to effect the perfect cleansing of the material operated on.

Without confining myself to the precise construction and arrangement of parts herein described, I claim as my invention, and desire to secure by Letters Patent—

1. The case D, and its plates c, in combination with the shaft C, and its plates b, when each of the latter plates is greater in diameter than the plate next above it, for the purpose specified.

2. The driving shaft E, and disk d, in combination with the shaft C, its adjustable roller f, and the lever k, or its equivalent; the whole being arranged and operating substantially as set forth.

In testimony whereof I have hereunto signed my name to this specification before two subscribing witnesses.

E. P. BARRABÉ.

Witnesses:
   Jno. G. Nicolay,
   F. T. Randolph.